United States Patent
Law et al.

(10) Patent No.: US 6,763,024 B1
(45) Date of Patent: Jul. 13, 2004

(54) METHOD AND DEVICES FOR CELL LOSS DETECTION IN ATM TELECOMMUNICATION DEVICES

(75) Inventors: Randall Allan Law, Surrey (CA); Steven Douglas Margerm, Surrey (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/417,833

(22) Filed: Oct. 14, 1999

(51) Int. Cl.$^7$ .......................... H04L 12/28; H04L 12/56
(52) U.S. Cl. ...................... 370/395.1; 370/397; 370/389
(58) Field of Search ............................ 370/395.1, 229, 370/230, 235, 236, 394, 242; 371/5.1, 65, 47.1; 379/16; 714/1, 2, 4, 48, 49, 52, 705, 728, 765, 798

(56) References Cited

U.S. PATENT DOCUMENTS

| | | | |
|---|---|---|---|
| 5,142,653 A | | 8/1992 | Schefts |
| 5,321,754 A | * | 6/1994 | Fisher et al. ................. 380/268 |
| 5,446,726 A | * | 8/1995 | Rostoker et al. ............ 370/232 |
| 5,491,697 A | | 2/1996 | Tremel et al. |
| 5,583,859 A | | 12/1996 | Feldmeier .................... 370/471 |
| 5,654,962 A | * | 8/1997 | Rostoker et al. ............ 370/232 |
| 5,657,316 A | * | 8/1997 | Nakagaki et al. ........... 370/394 |
| 5,703,878 A | | 12/1997 | Duault ........................ 370/395 |
| 5,757,775 A | * | 5/1998 | Yokoyama et al. .......... 370/242 |
| 5,802,050 A | | 9/1998 | Petersen et al. ............. 370/394 |
| 5,878,063 A | * | 3/1999 | Kawasaki et al. ........... 714/818 |
| 5,898,669 A | * | 4/1999 | Shimony et al. ............. 370/232 |
| 6,038,231 A | * | 3/2000 | Dolby et al. ................. 370/394 |
| 6,141,326 A | * | 10/2000 | Minami ...................... 370/244 |
| 6,147,998 A | * | 11/2000 | Kelley et al. ............. 370/395.1 |

* cited by examiner

Primary Examiner—Wellington Chin
Assistant Examiner—Jamal A. Fox
(74) Attorney, Agent, or Firm—Oyen Wiggs Green & Mutala

(57) ABSTRACT

Methods and devices for detecting cell loss in telecommunication devices, such as ATM switches, attach cell loss detection information to cells in cell streams passing through the telecommunications devices. The cell loss detection information can trigger counters at up stream and down stream locations thereby avoiding the problem of synchronizing counters and ensuring that all cells to be counted have been flushed through the telecommunications device. The cell loss detection information can include a sequence number in a sequence of n sequence numbers where n is not a power of 2. Preferably $n=2^P-1$, where P is an integer. Such series of sequence numbers allow the detection of lost cells in bursts consisting of a number of lost cells which is a power of 2. The methods and apparatus of the invention permit detection of unintentionally dropped cells in a call without the need to tear down the call.

28 Claims, 15 Drawing Sheets

METHOD AND DEVICES FOR CELL LOSS DETECTION IN ATM TELECOMMUNICATION DEVICES

TECHNICAL FIELD

This invention relates to asynchronous transfer mode ("ATM") telecommunication devices. The invention has particular application to ATM switches. The invention provides methods and devices for detecting the loss of ATM cells in one or more cell streams passing along one or more data paths in a telecommunication device.

BACKGROUNDS

An ATM network is a connection-oriented packet switched network. An ATM network includes a number of ATM telecommunication devices, including ATM switches, which interconnect ATM end points via point-to-point transmission links. A "call" may be set up to provide one or more virtual connections between selected endpoints. Cell streams flow along the virtual connections from one end point on the network to another. On their way, the cell streams traverse various ATM switches and other telecommunication devices.

The telecommunication devices in modern ATM networks must operate at extremely high levels of reliability at extremely high speeds. The increasing importance of real time applications such as video conferencing, video-on-demand, and the general increase in the amount of data which must be moved from place to place is placing ever higher demands on ATM telecommunications networks.

In ATM networks, information is delivered across transmission links in fixed-length cells. Each cell includes a data payload and a header which includes information about the cell and its destination. In the current version of ATM specified in Bellcore, Generic Requirements, GR-1113-CORE, "Asynchronous Transfer Mode (ATM) and ATM Adaptation Layer (AAL) Protocols", each ATM cell has 53 bytes including a 48 byte payload and a 5 byte header.

Data packaged in ATM cells can be sent over the ATM network from one end point to another. In any ATM network some loss of ATM cells may occur during normal operation. ATM uses admission control and resource reservation when a call is set up between two endpoints to provide guaranteed levels of bandwidth and other quality of service ("QoS") parameters for the call. ATM networks are designed to permit ATM cells to be dropped. ATM cells can be dropped, for example, as the result of the operation of usage parameter controls ("UPC") at the ingresses of ATM switches. UPC may refuse to accept cells in certain cell streams to prevent an ATM switch from becoming overloaded in a manner which could interfere with QoS guarantees for an existing call. ATM cells may also be dropped as a result of buffer overflows at queuing points in ATM switches or other telecommunication devices.

Various measures are used to evaluate the QoS provided end-to-end by an ATM call connecting two ATM end points. One aspect of QoS is the proportion of ATM packets which are dropped. For example, it may be necessary or desirable to guarantee that no more than 1 in every $10^7$ or $10^8$ ATM cells traversing a particular call will be dropped. Various tools and techniques are available to establish the rate at which ATM cells are dropped over an end-to-end link. Tools are also provided to test for the number of ATM cells which are dropped over a particular transmission link which connects two ATM switches. In general, however, the current ATM network technology assumes that ATM cells are never unintentionally lost internally to an ATM switch. This is a problem because ATM cells can be lost internally to ATM switches, particularly when the switches are operating at extremely high data rates.

Furthermore, malfunctions in switches can cause the loss of ATM cells. An ATM cell may be lost from a data stream if, for example, its header becomes corrupted so that the cell is no longer recognized as being part of the cell stream to which it should belong. Unintentional cell loss is a "silent failure" which will only be detected if an end customer complains.

It is known to detect cell loss in an ATM switch by providing ingress and egress counters for each virtual circuit passing through the switch. The ingress counters count the number of ATM cells in a virtual circuit which enter the switch and the egress counters count the number of ATM cells in the virtual circuit leaving the switch. The problem with this approach is that there is no way to know how many cells in the cell stream for a virtual circuit are buffered within the switch at any given time. At any given time, there may be thousands of cells buffered at various queuing points within an ATM switch, or other ATM telecommunication device.

A second problem with using ingress and egress counters to detect cell loss is a synchronization problem. Ingress and egress counters must be sampled at exactly the same time (typically within 1 microsecond of each other, or faster) in order to obtain meaningful results. This is typically impossible where the polling of counters is controlled by software. One could reduce the error caused by the fact that ingress and egress counters cannot be sampled at exactly the same times but providing high capacity counters and integrating over a long period of time. This, however, delays the availability of results.

Schefts, U.S. Pat. No. 5,142,653 proposes a system which includes a low capacity circular counter for each virtual connection in a switch. The counters are set up when a virtual connection is established. After the virtual connection is cleared down the loss rate for the virtual connection is calculated from the counter values. The cell loss rate is determined by the difference in cells counted by the egress and ingress counters on clear down. The disadvantage of this approach is that it only detects cell loss when a call is completed.

Tremel et al., U.S. Pat. No. 5,491,697 generates and inserts measurement cells into a cell stream. The number of measurement cells received at a reception and processing unit can be tracked as can be the total number of cells received at the reception and processing unit. The Tremel et al. device does not enable the direct detection of lost cells. Furthermore, the insertion of measurement cells decreases throughput of the network for other ATM cells.

Kawasaki et al., U.S. Pat. No. 5,878,063, adds 1 byte to each ATM cell which is received at a switch. In that 1 byte, 1 bit is allocated for a cell counting flag. The cell counting flag is set for a given period of time. A counter down stream counts the number of cells in which the flag has been set. The same count start/stop command both terminates counting and terminates the insertion of cell counting flags At the end of the counting period the system checks to see if the down stream count matches the up stream count. The Kawasaki et al. device does not deal with the problem that a certain number of cells will be buffered within a switch or other telecommunications device at any given time and does not operate continuously.

Yokoyama et al., U.S. Pat. No. 5,757,775 discloses a system for protecting against cell loss in a telecommunications system. A cell loss detector is provided in a ATM-PBX interface. Each cell reaching the cell loss detector has a sequence number. The cell loss detector watches incoming cells for discontinuities in the sequence numbers. If there is a discontinuity in the sequence numbering then the cell loss detector signals a cell loss. The sequence number used by the Yokoyama device is the 3-bit serial count sub-field of the 4-bit serial number field specified for the AAL layer of ATM cell formats according to ITU-T Recommendations I-363 and I-365.1. Consequently, the Yokoyama device will work only for AAL-1 cell streams.

There is a need for methods and apparatus for reliably detecting the unintended loss of ATM cells within ATM telecommunications devices. There is a particular need for a method and devices which can detect unintentional cell loss without tearing down virtual circuits in the switch or other telecommunications devices. Preferably the number of lost cells is detected as well as the fact that some cells have been lost. There is a need to detect the location at which ATM cells are unintentionally dropped so that suitable corrective action may be taken.

SUMMARY OF THE INVENTION

This invention provides methods and apparatus for detecting cell loss in ATM telecommunication devices in which a synchronization signal is delivered from upstream locations to downstream locations in ATM cell streams. One aspect of the invention provides a method for detecting cell loss in a ATM telecommunication device, the method comprises counting cells in a cell stream at an upstream location in a telecommunication device; counting cells in the cell stream at a downstream location in the telecommunication device; in response to a toggle event, preserving a count at the upstream location and passing a count synchronization signal in a cell in the stream; at the downstream location, receiving the cell, detecting the count synchronization signal and, in response to the count synchronization signal, preserving the down stream count; and, comparing the up stream and down stream counts.

Further aspects and advantages of the invention are described below.

BRIEF DESCRIPTION OF DRAWINGS

In drawings which illustrate non-limiting embodiments of the invention.

DESCRIPTION

Figure 1:
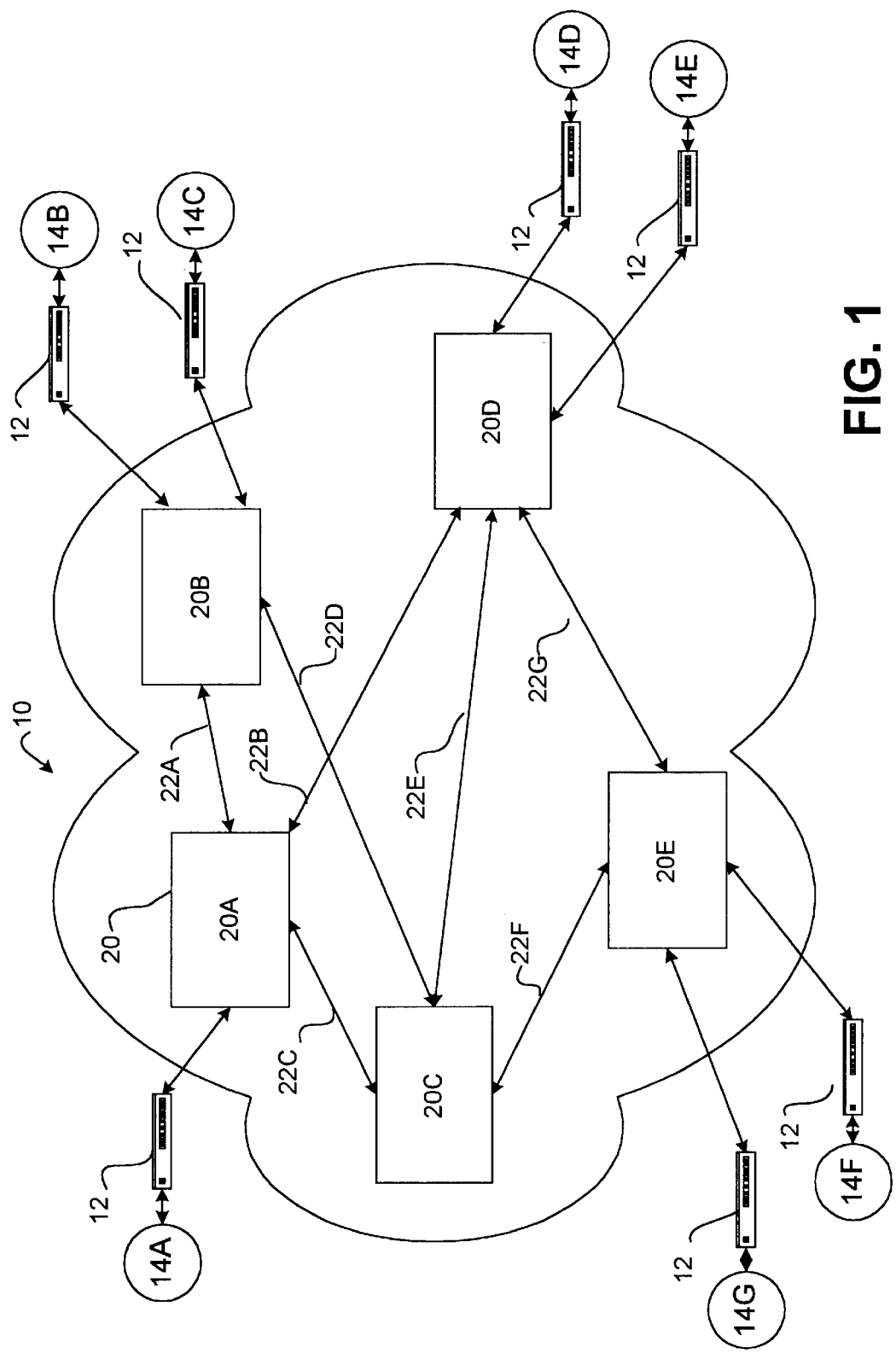
FIG. 1 is a schematic view of a prior art ATM packet switched network.

FIG. 1 illustrates a simple ATM network 10. Network 10 permits data to be interchanged between a number of network edge devices 12. Each network edge device 12 provides an end point. The simple network of FIG. 1 permits data to be interchanged between 7 end points 14A through 14G.

Network 10 comprises 5 ATM switches 20 linked by communication links 22. Communication links 22 typically comprise fiber-optic cables but may also comprise wired or wireless connections. Communication links 22 may carry ATM cells by any of a variety of physical layer protocols.

Figure 2:
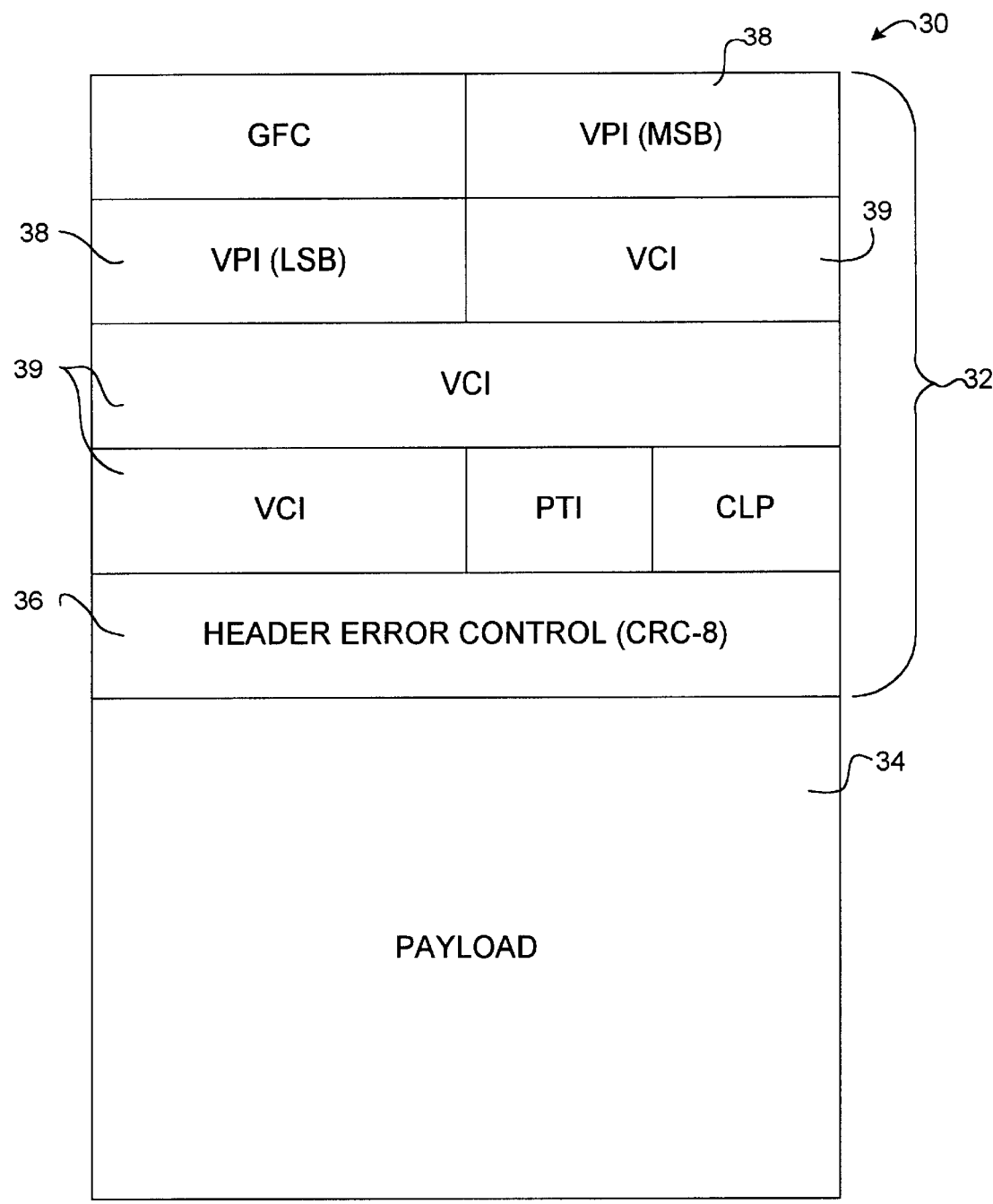
FIG. 2 is a schematic view illustrating the format of a standard ATM cell.

FIG. 2 shows the structure of a cell 30 according to the current ATM standard. Cell 30 comprises a 5-byte header 32 and a 48-byte payload 34. Cell 30 has a total of 53 bytes. Header 32 has a number of fields including a virtual path identifier ("VPI") field 37, a virtual channel identifier ("VCI") field 39 and a header error control byte 36. In some portions of an ATM network a portion of VPI field 38 may be allocated for generic flow control ("GFC"). In this specification the term "VPI field" includes any portion of the VPI field which may be allocated to GFC.

Any link 22 in network 10 will typically be carrying ATM cells 30 for a number of different VCCs at any given time. As the destination of each cell is specified by the combination of the cells virtual path and virtual channel (VPI/VCI) it is necessary to operate network 10 in such a manner that there is never a case where cells belonging to different VCCs traversing a single link 22 have the same VPI/VCI value. Because VCCs are being set up and taken down on a continuous basis it is generally impractical to assign VPI/VCI values to each VCC in a manner which ensures that the above-noted situation will never arise. Consequently, ATM networks assign values of VPI and VCI for each link 22.

Figure 3:
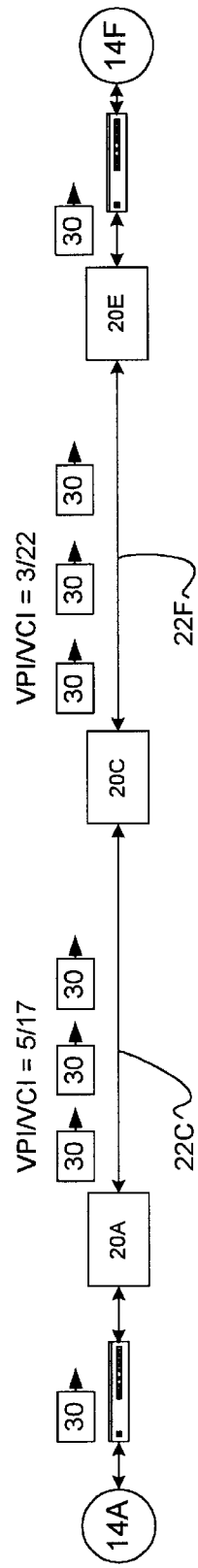
FIG. 3 is a block diagram illustrating the flow of ATM cells on one VC across the ATM network of FIG. 1.

FIG. 3 shows an example of a possible VCC connecting end points 14A and 14F. Cells in the VCC are delivered to switch 20A and then travel to switch 20C via link 22C. The cells then travel through switch 20E on link 22F. Finally the cells are delivered by switch 20E to end point 14F. In the given example, cells are assigned the VPI/VCI 5/17 for the time they are traversing link 22C and are assigned the VPI/VCI 3/22 for the time they are traversing link 22F. These values are chosen at the time the VCC is set up so as not to conflict with the VPI/VCI values for any other VCC traversing links 22C or 22F respectively.

At switch 20A, each packet in the VCC is assigned the VPI/VCI 5/17. These values are written to the VPI and VCI fields in the cell header 32 for each cell travelling in the VCC. In switch 20C the VPI/VCI pair 5/17 is read and switch 20C determines that the appropriate VPI/VCI for link 22F is 3/22. Switch 20C therefore writes VPI equal to 3 in the VPI field 38 of cell 30, writes VCI equal to 22 in the VCI field 39 of cell 30 and forwards cell 30 out the port connected to link 22F for delivery to switch 20E.

Cells 30 may become unintentionally lost in transit between endpoints 14A and 14F. Switches 20A, 20C and 20E operate very high speeds. It is possible that the header of any cell 30 may become corrupted in passing through a switch. A header may become corrupted due to faulty hardware, transient events such as the interaction of gamma rays with memory devices inside a switch, power fluctuations or the like. It is difficult to determine where such unintentional cell losses occur. Cells 30 could be lost in one of communication links 22C or 22F, or one of switches 20A, 20C or 20E, or one of network edge devices 12, or in the communication links 22 connecting edge devices 12 with switches 20A and 20E respectively.

Figure 4:
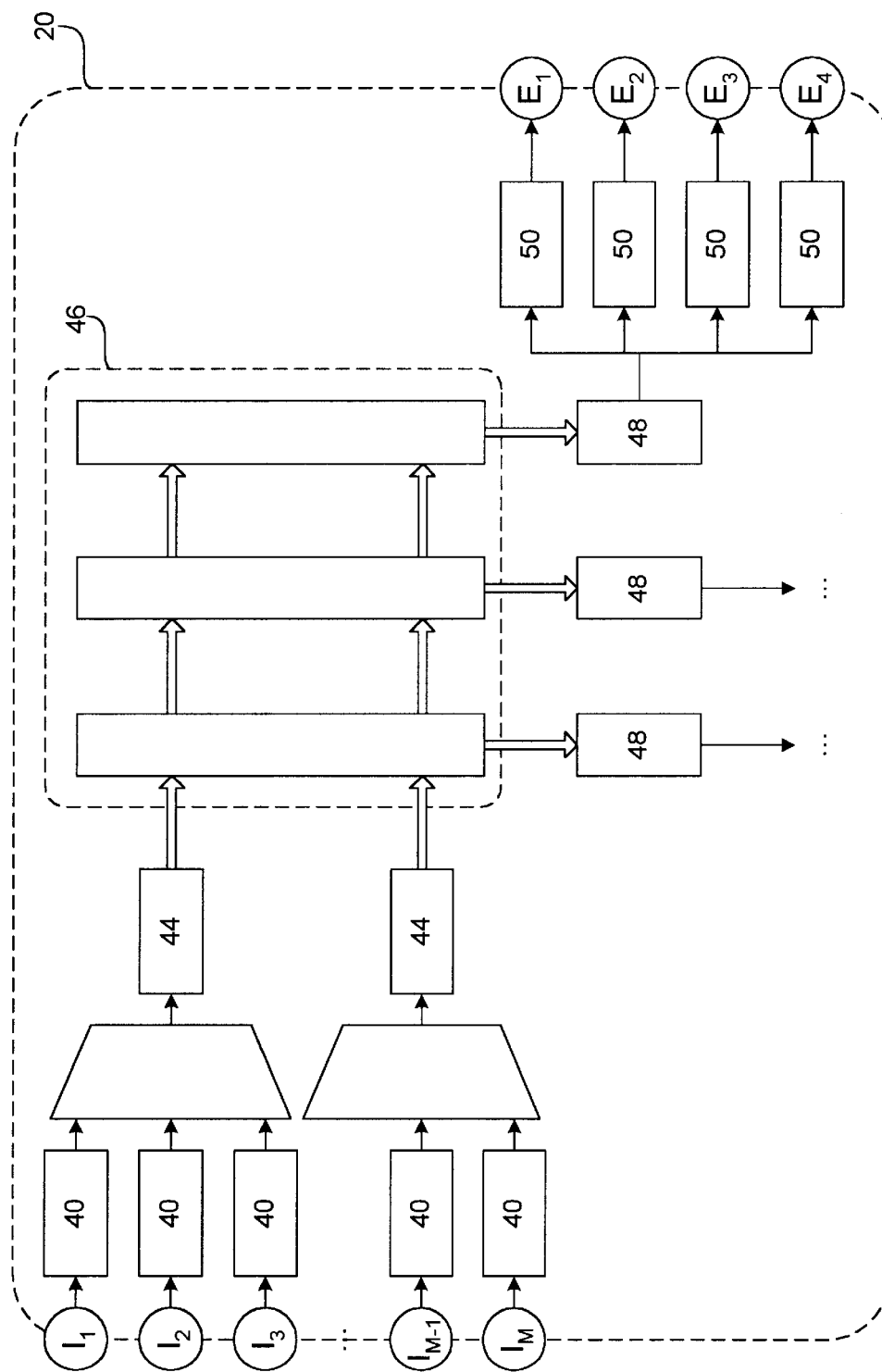
FIG. 4 is a block diagram illustrating some major components in a typical ATM switch.

FIG. 4 illustrates a typical ATM switch 20. Switch 20 has a number of ingress ports I and a number of egress ports E. Cells are received at ingress points I and delivered to ingress cards 40. Cells from several ingress cards 40 may be passed to a multiplexer 42 and to a hub 44. Hub 44 passes the cells into a switching matrix 46. Switching matrix 46 selectively directs the cells to one of several hubs 48. From hubs 48 the cells are directed to egress cards 50 which are each connected at one of egress ports E to an outgoing link 22.

Typically, at ingress cards 40 the VPI/VCI information for each cell is read and converted to a connection identifier which is used internally in switch 20. The connection identifier identifies the egress port to which the cell should be directed and also specifies the VCC to which the cell in question belongs. At egress ports 50 the connection identification is used to determine the VPI/VCI to be used for the cell on the next communication link 22. The connection information is typically included as part of proprietary header which is added to the cell at an ingress card 40. In order to maximize throughput of switch 20 it is generally desirable to keep the size of the proprietary header to a minimum.

While it is not illustrated here, an ATM switch such as the one shown in FIG. 4 typically includes parallel redundant fabric such that if there is a failure in one part of this fabric the switch can continue to operate. Furthermore, the switch typically includes a number of separate circuit boards which can be individually removed and replaced to correct any problems which may develop. Cell loss may occur at any point within switch 20.

This Invention

Figure 5:
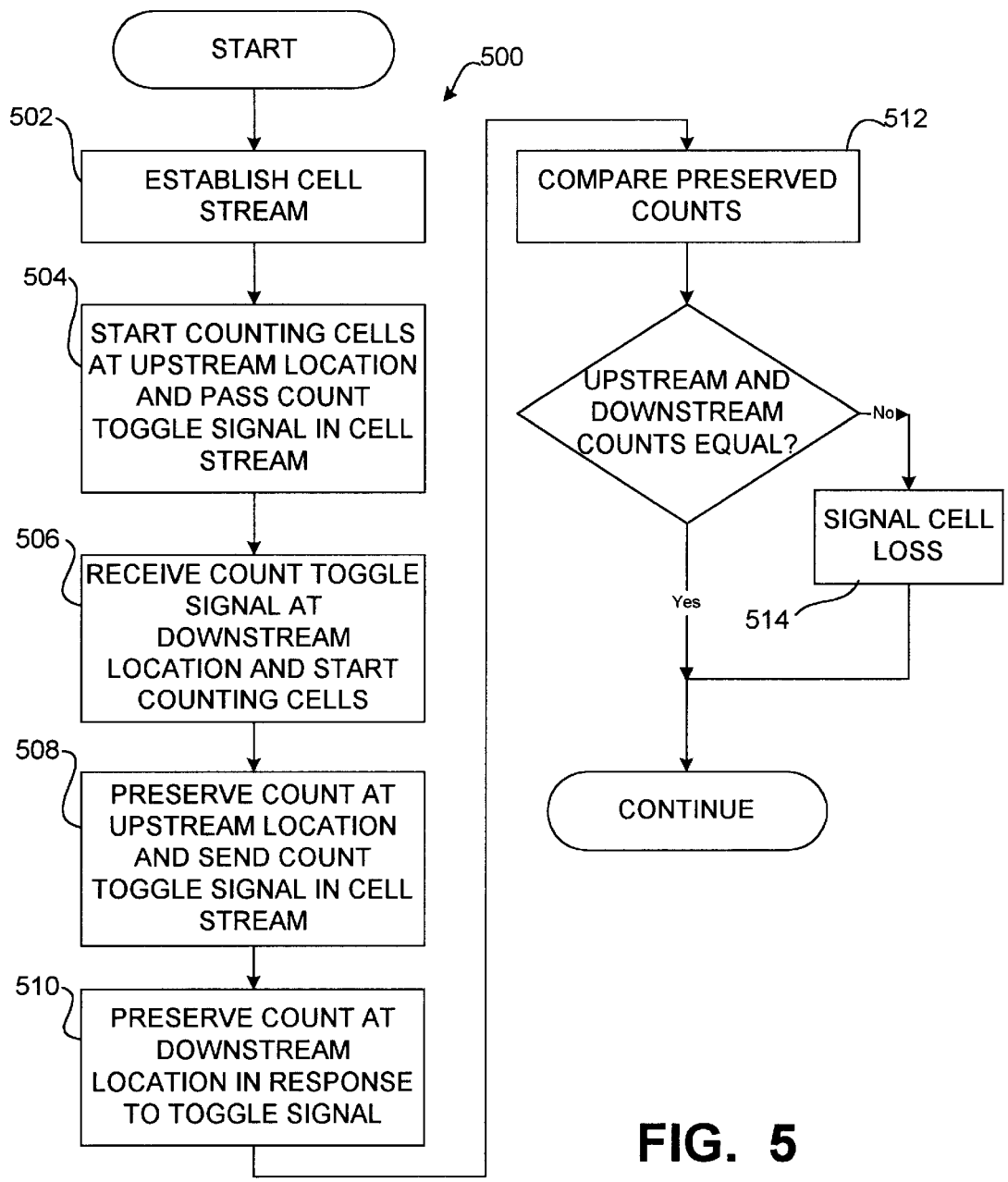
FIG. 5 is a flowchart illustrating a method according to the invention.

FIG. 5 shows a method according to this invention. In method 500 a cell stream is established within a telecommunication device (Step 502). A cell stream is, for example, the sequence of ATM cells being passed along a particular virtual circuit on a data path which extends between one ingress of an ATM switch to one egress of the ATM switch. Cells 30 belonging to the cell stream are counted at an up stream location on the data path. When counting is started a synchronization signal is passed in the cell stream (Step 504). As explained below, the synchronization signal may take various forms. What is important is that the synchronization signal is passed in the cell stream. This ensures that the count synchronization signal will not be acted on at the downstream location until all cells ahead of the cell containing the count synchronization signal have passed along the data path.

When the count synchronization signal is received at a downstream location the cells 30 are counted at the downstream location (Step 506). While preserving the counted value at the up stream counter, a count synchronization signal is passed to the down stream location in a cell in the cell stream (Step 508). Upon receiving the count synchronization signal at the down stream location, the count at the down stream location is preserved (Step 510). The counts at the upstream and downstream locations can then be compared (Step 512). The comparison may be done either in hardware or software.

It can be appreciated that method 500 avoids the need to sample the up stream and down stream counters at exactly the same instant in time. ATM cells in a cell stream are passed along the cell stream in sequence so the use of an ATM cell in the cell stream to pass a count synchronization signal to the down stream counter ensures that all of the ATM cells which were counted at the up stream counter have had a chance to reach the down stream counter before the count at the down stream counter is preserved. If the counts are not identical then a cell loss signal may be generated (step 514). The difference between the counts at the upstream and downstream locations indicates how many cells have been dropped from the cell stream between the upstream and downstream locations.

Method 500 detects all missing cells, whether or not those cells were unintentionally dropped from the cell stream. If it is desired to determine how many cells were unintentionally dropped from the cell stream then it would be necessary to subtract from the total number of dropped cells, the number of cells which were intentionally dropped from that cell stream. Typical telecommunication devices include counters which count the number of cells intentionally dropped from each cell stream.

So that all cells lost in a telecommunication device, such as an ATM switch, it can be detected, it is generally desirable that the upstream counter be located as closely as possible to the ingress to the telecommunication device and at least one downstream counter be located as closely as possible to the egress to the telecommunication device. In order to determine where within a telecommunications device cells are being unintentionally dropped it may also be desirable to have intermediate down stream counters located at various places within the telecommunications device. For example, it might be desirable to have downstream counters located at the ingress and egress of each replaceable unit within a telecommunications device so that cell loss occurring within any particular replaceable unit can be detected and remedied.

It is typical in many telecommunications devices to add to each ATM cell an additional header which includes information for use in routing and handling the cell within the telecommunications device. The count synchronization signal may be included within an additional data set added to the ATM cell. The additional data set could be such an additional header or could be an additional trailer.

In the alternative, the count synchronization signal can be included within a field of the standard ATM cell header which is not being used within the telecommunications device. For example, within many telecommunications devices the function of the VPI and VCI fields in the standard ATM cell headers is replaced by a connection identifier field contained in an added header. While the cell is within the switch or other telecommunications devices, the value of the VPI/VCI fields is not meaningful. The values of the VPI and VCI fields are typically reset for each communications link 22 (FIG. 1) of the VC along which the cell is travelling. Therefore the previous values of the VPI and VCI fields do not need to be preserved. Including the count synchronization signal in the VPI and/or VCI fields of an ATM cell has the advantage that the count synchronization signal does not consume bandwidth within the telecommunication device. Thus, including the count synchronization signal in the VPI and/or VCI fields of ATM cells is preferred where the methods of the invention will be practised on existing telecommunication devices in which internal data paths were not designed to provide increased internal bandwidth for count synchronization signals.

In some types of ATM switching the VCI field is not rewritten at the egress of the switch but the VPI field is rewritten. In such cases the count synchronization signals may be included in all, or a portion of the VPI field of ATM cells.

If the count synchronization signal is written into the VPI and/or VCI fields of cells then preferably a flag in an additional header or trailer of the cell is set to indicate that the VPI and/or VCI fields contain the count synchronization signals. In some cases the methods of the invention will not be applied to all cell streams in a telecommunication device. In such cases the flag is needed so that downstream cell counters will not attempt to interpret VPI and/or VCI values as count synchronization signals in those cells belonging to streams which do not have count synchronization signals written to their VPI/VCI fields.

In preferred embodiments of the invention, the count synchronization signal comprises one or more bits located within a portion of the. VPI or VCI fields in the 5-byte ATM cell header of cells in cell streams being monitored. When the function of the VPI/VCI fields in a cell has been redefined it is preferable to provide a bit in an additional header attached to the cell to indicate that the VPI/VCI fields have been redefined.

EXAMPLE 1

Flag in ATM Cells Carries Count Synchronization Signals

Figure 6:
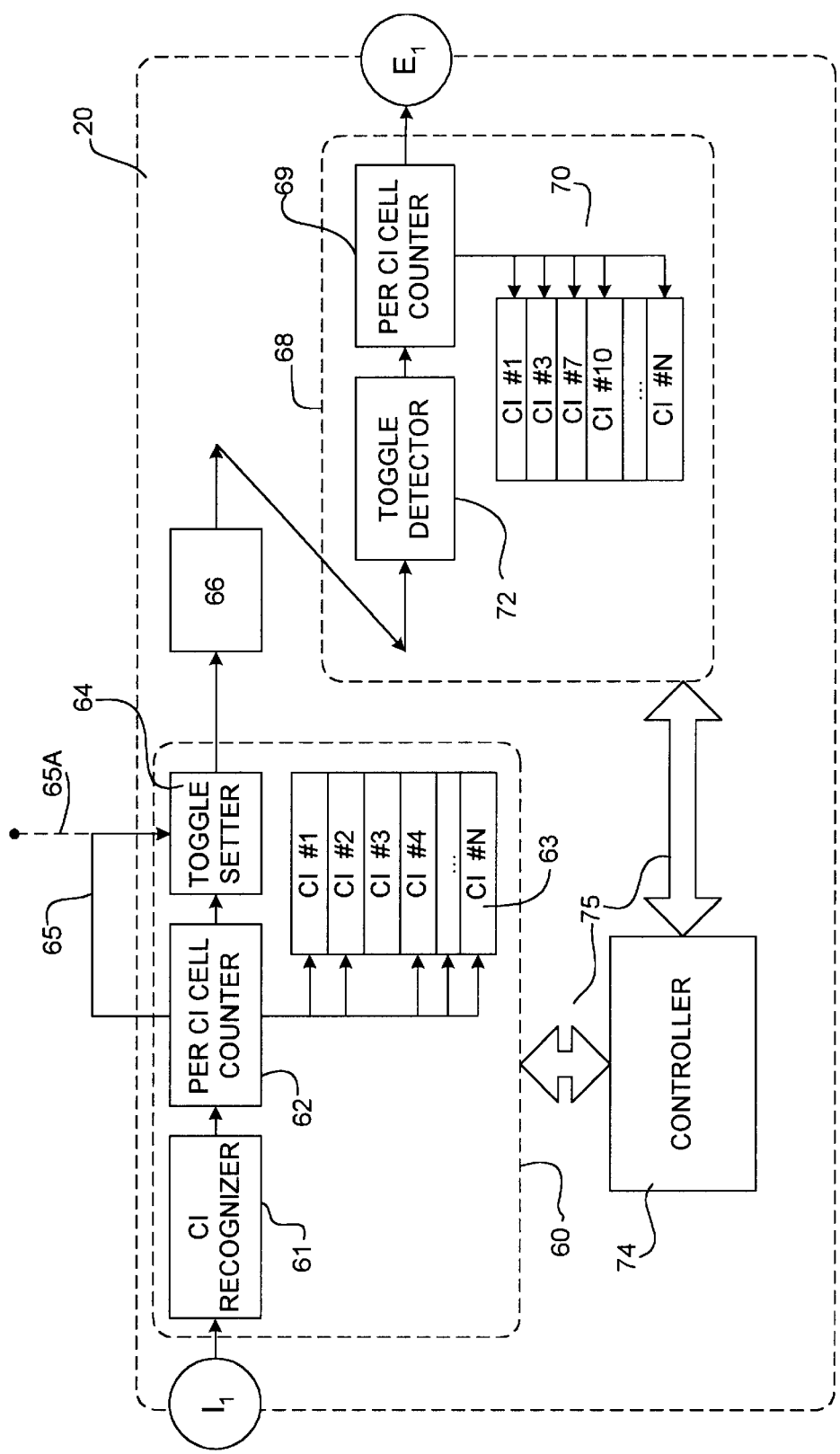
FIG. 6 is a block diagram illustrating a device set up according to a first exemplary embodiment of the invention.

FIG. 6 shows schematically a portion of an ATM switch 20 set up according to one embodiment of the invention. On a card 60 near the ingress I1 of the switch 20 is a connection identification recognizer 61. CI recognizer 61 reads VPI/VCI values from incoming ATM packets received at ingress $I_1$ and translates those values into a connection identifier ("CI") which is used to route cells internally within switch 20. ATM packets then pass to a counter 62 which maintains a separate count for ATM cells having each different connection identifier. In the embodiment of FIG. 5 an array 63 in a memory on card 60 contains locations for storing the number of ATM cells in the cell stream associated with each connection identifier. ATM cells then pass through a synchronization bit setter 64. Synchronization bit setter 64 sets one or more bits within each ATM cell 30 to indicate whether counting at a down stream counter 69 should commence or stop.

Counted cells 30 pass through other parts of the switch as indicated generally by 66 and reach a card 68 at the egress of switch 20. Card 68 has a counter 69 and an associated data structure 70 which maintains a separate count of received ATM cells in the cell stream associated with each connection identifier. It should be noted that the list of connection identifiers represented in array 70 will, in general, be different from the list of connection identifiers represented in array 63 because some cell streams originating at ingress I1 will not pass through egress E1 and some cell streams exiting through egress E1 will not originate from ingress I1. Card 68 also includes a toggle event detector 72 which monitors the synchronization bit in each cell 30 and determines whether the synchronization bit indicates that the number of cells 30 in the cell stream in question should be preserved.

When toggle event detector 72 detects a toggle event (for example a change in the value of the synchronization bit between two cells) then it causes counter 20 to preserve the cell count for the cell stream to which the toggle event belongs. The preserved cell count can then be read by a controller processor 74 by means of a suitable bus 75. Controller 74 can compare the number of cells counted by counters 62 and 69 and generate a cell loss signal if the counts differ.

Figure 7:
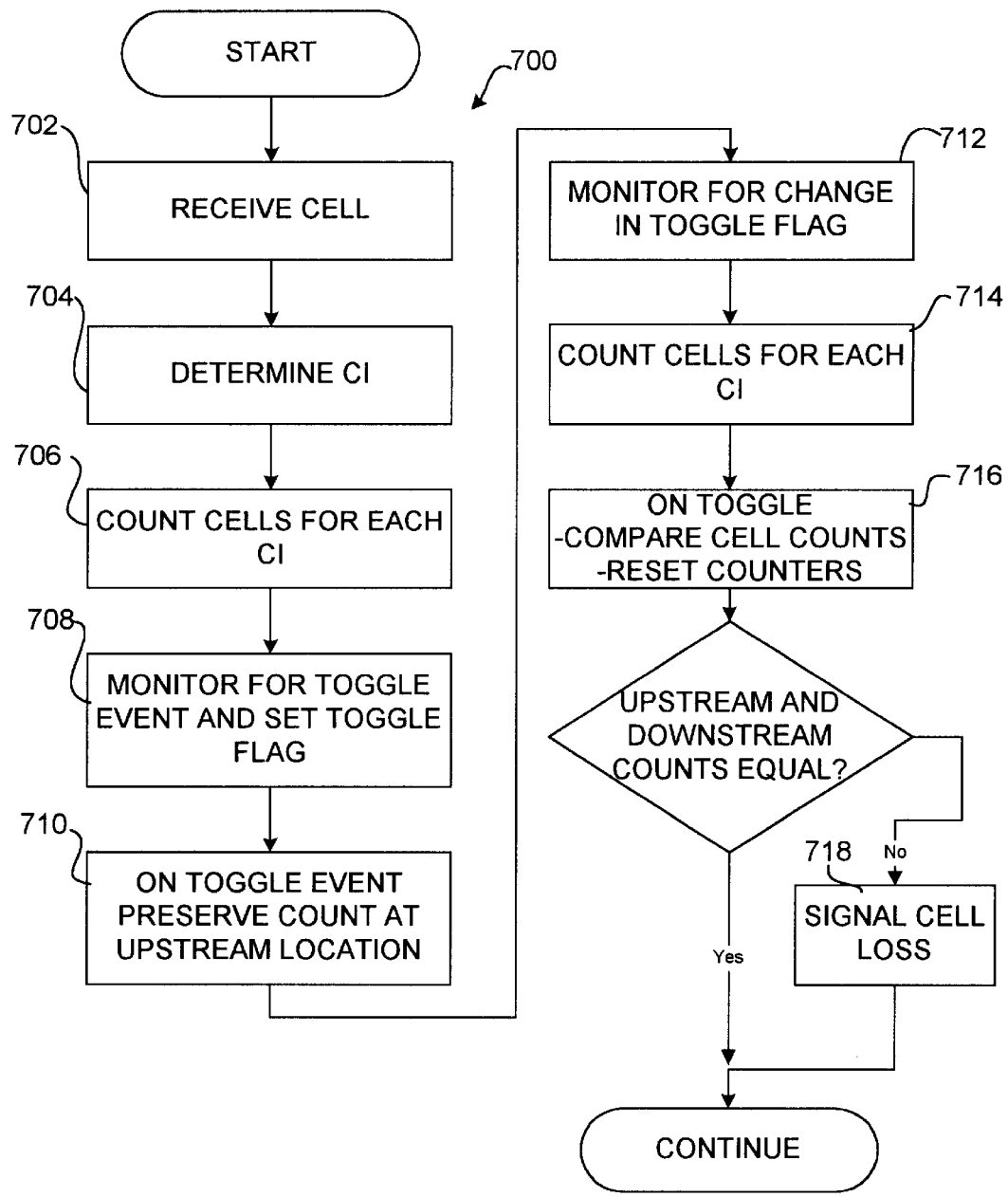
FIG. 7 is a flowchart illustrating a method according to the first exemplary embodiment of the invention.

FIG. 7 illustrates a method 700 according to which the apparatus of FIG. 6 may be used. A cell is received at board 60 (Step 702). The connection identifier for the cell is then determined (Step 704) and the counter in array 63 which corresponds with the connection identifier of the cell stream to which the cell belongs is incremented (Step 706). In step 708 synchronization bit setter sets a synchronization flag in the cell. The way in which the synchronization flag is set depends upon whether a toggle event has been detected. The synchronization flag may be a single bit in the cell. The synchronization flag may be in a header attached to the cell by switch 20. On the occurrence of a toggle event the synchronization flag is set in a manner which signals to downstream locations that a toggle event has occurred. On the occurrence of a toggle event affecting a cell stream, the value of the cell count for that cell stream is preserved (step 710). Preserving the count might include copying the count value to a different register or preventing the value in the counter location from being changed.

At the down stream location of counter 69, cells are received and their synchronization flags are read to determine whether a toggle event has occurred (step 712). The cells in each cell stream are counted again (Step 714). When a synchronization signal is detected in a cell stream, the value of the downstream counter 70 for that cell stream is compared to the preserved value of the upstream counter 63 for the cell stream (step 716). This typically involves synchronization detector 72 causing counter 69 to preserve the value of the counter in array 70 for the cell stream in question and sending a signal to controller 74 on bus 75. Processor 74 then retrieves and compares the preserved values of the upstream and downstream counters for the cell stream. If the values in the two counters are different then the method generates an error signal (Step 718).

A toggle event may comprise any of a number of different occurrences. By way of example only, a toggle event for a cell stream may occur when the counter in array 63 for the cell stream reaches a desired value. For example, counters in array 63 could be 32-bit counters and the synchronization flag could be set to equal the highest order bit in the applicable counter. FIG. 6 shows a signal line 65 which carries the value of the highest order bit of each counter in array 63 to synchronization setter 64. In this case, the toggle event would occur each time the value of the highest order bit of the counter for a cell stream changed.

Where a toggle event is generated each time a certain number of cells in a cell stream pass through counter 62 then, in a preferred embodiment of the invention the counters in array 70 count down. If this is done then, when synchronization detector 72 detects a signal indicating that a trigger event has occurred, the value in the applicable counter in array 70 indicates the number of cells lost from the cell stream. If the value of that counter is zero then no cells have been lost. If the value is not zero then at least one cell has been lost and the number of lost cells is equal to the value in the counter. Furthermore, comparing counter values in upstream and downstream counters is easier where the counters in array 70 count down because no subtraction is needed. This saves CPU time if the comparison is done in software and also makes it easier to provide hardware to implement such comparisons.

For example, if array 63 maintains a 32 bit counter for each cell stream and a toggle event occurs each time the highest order bit of a counter changes then a toggle event for a cell stream will occur once for every $2^{31}$ cells in the cell stream which pass through counter 62. The counters in array 70 could be initialized to $2^{31}$ and could be decremented each time a cell in the cell stream passes through counter 69.

It is also possible to practice this invention by providing an externally generated toggle event. signal. For example, the value of the synchronization flag could be changed in response to a control signal provided on a signal line 65A to synchronization bit setter 64 by processor 74.

EXAMPLE 2

Count Synchronization Signal Switches Between Counters

Figure 8:
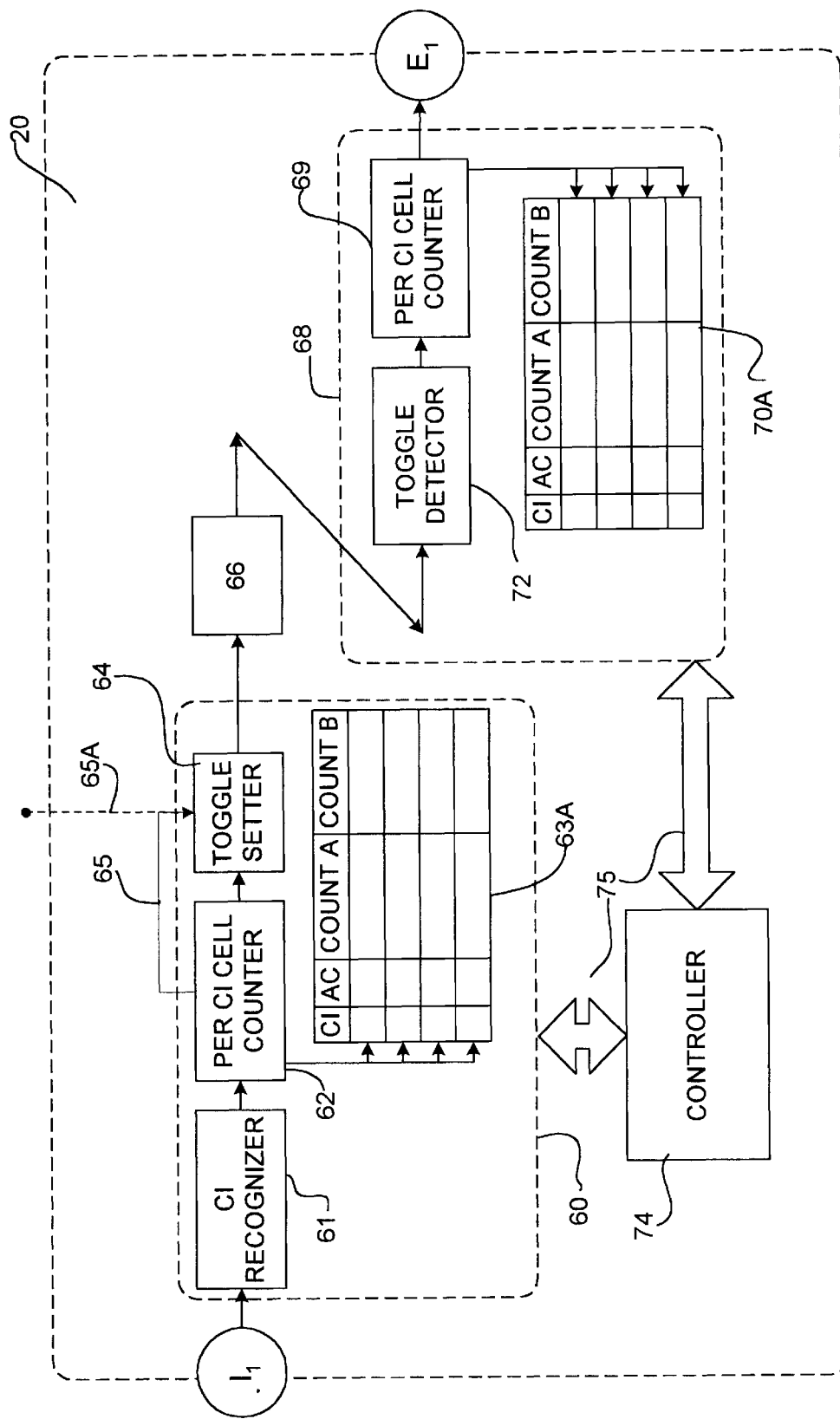
FIG. 8 is a block diagram illustrating a device set up according to a second exemplary embodiment of the invention.

FIG. 8 shows a portion of a switch 20 set up according to a second exemplary embodiment of the invention. In FIG. 8, instead of a single counter for each cell stream passing through the counting device 62, there are two or more separate counters for each cell stream. In the illustrated embodiment there are two counters which are labelled for reference COUNTER A and COUNTER B. At any given time only one of the two counters is active. Which counter is active is indicated in an active counter ("AC") field within array 63. The inactive one of the two counters for each cell stream preserves the value that it had immediately before becoming inactive.

On the occurrence of a toggle event for a cell stream, counter 62 switches to the other counter for that cell stream. Synchronization setter 64 writes a value to a synchronization flag within cells in each data stream in a manner which signals to downstream synchronization detector 72 when a toggle event has occurred for that cell stream.

Figure 9:
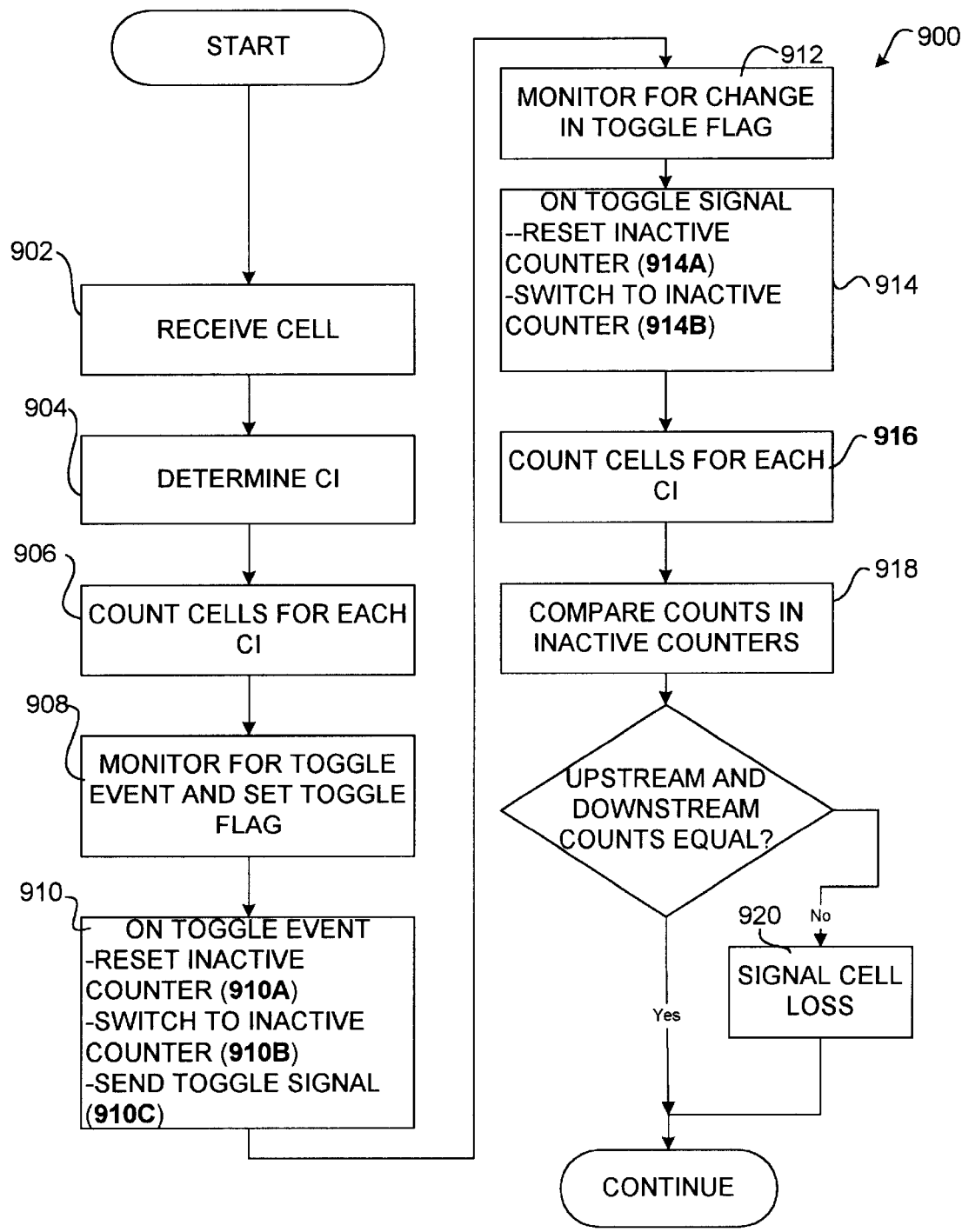
FIG. 9 is a flowchart illustrating a method according to the second exemplary embodiment of the invention.

FIG. 9 illustrates a method 900 which may be practised with the apparatus of FIG. 8. Method 900 begins by receiving a cell at a telecommunication device (step 902). The connection identifier for the cell is then determined by CI recognizer 61 (step 904). Counter 62 increments the active counter for the cell stream to which the cell belongs (step 906). Synchronization setter 64 sets a synchronization flag for each cell at step 908. On a toggle event (Step 910) the non-active counter is reset (Step 910A), the non-active counter is made active and the active counter is made inactive (Step 910B) and synchronization flag setter 64 generates a synchronization signal, for example by setting the value of the synchronization flag to a different value, in a manner which indicates that a toggle event has occurred to down stream counters (Step 910C). The synchronization signal may be, for example, a change in a state of a synchronization flag between one cell and the next cell or a lack of change of state of the synchronization flag between two cells where a change of state is expected.

At a downstream location, the synchronization flag is read for the cell in the cell stream (step 912). On detecting a synchronization signal (step 914) the non-active counter at counter 69 is reset (step 914A) and the inactive counter is made active (Step 914B). The cells in each cell stream are counted (Step 916). In Step 918 the number of counted cells for the cell stream in inactive counters of arrays 63A and 70A are compared. If the numbers match then there has been no cell loss. If the numbers do not match then a cell loss error signal can be generated at Step 920.

EXAMPLE 3

Count Synchronization Signal Carried in PM Cells

Figure 10:
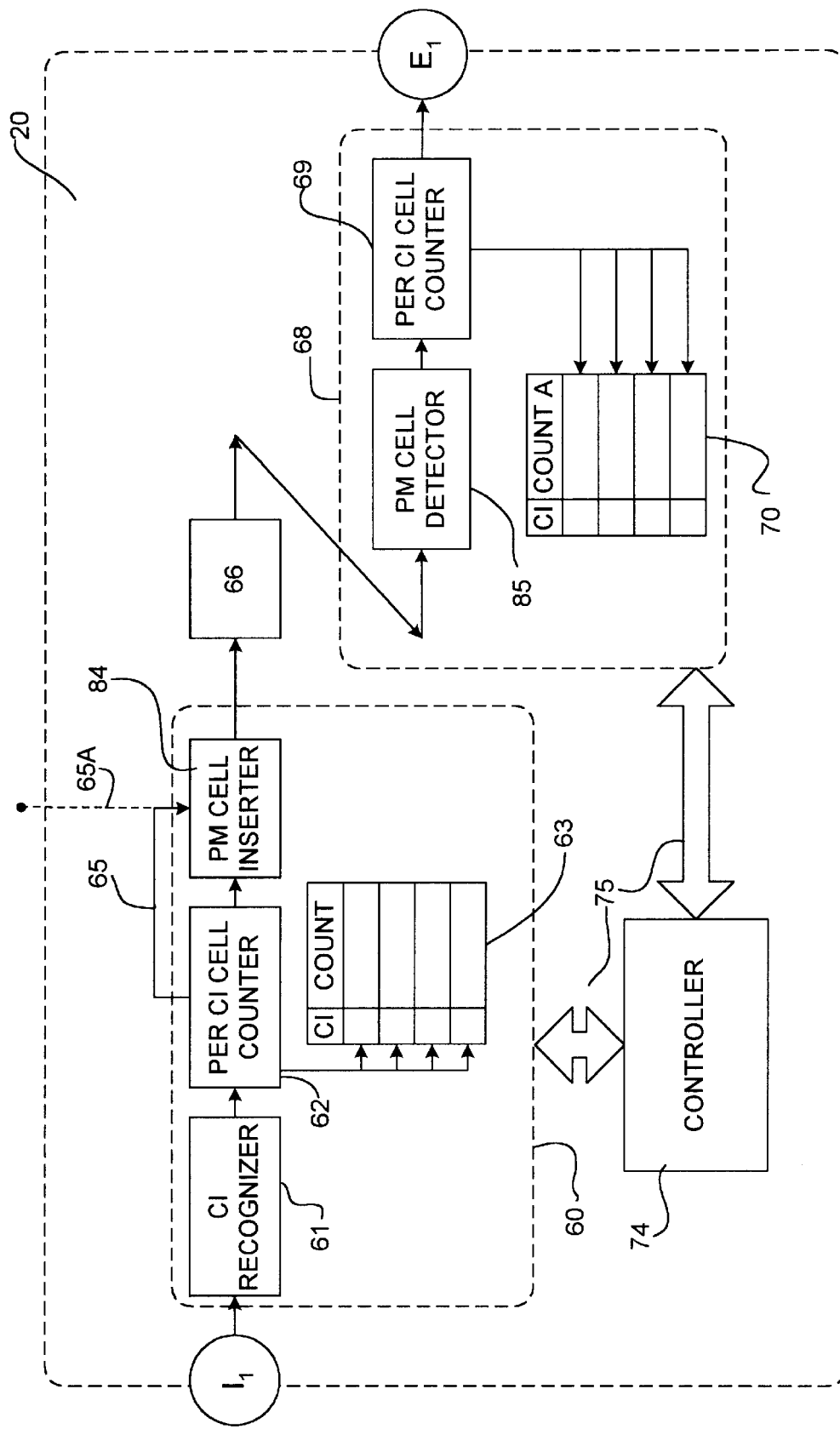
FIG. 10 is a block diagram illustrating a device set up according to a third exemplary embodiment of the invention.
Figure 11:
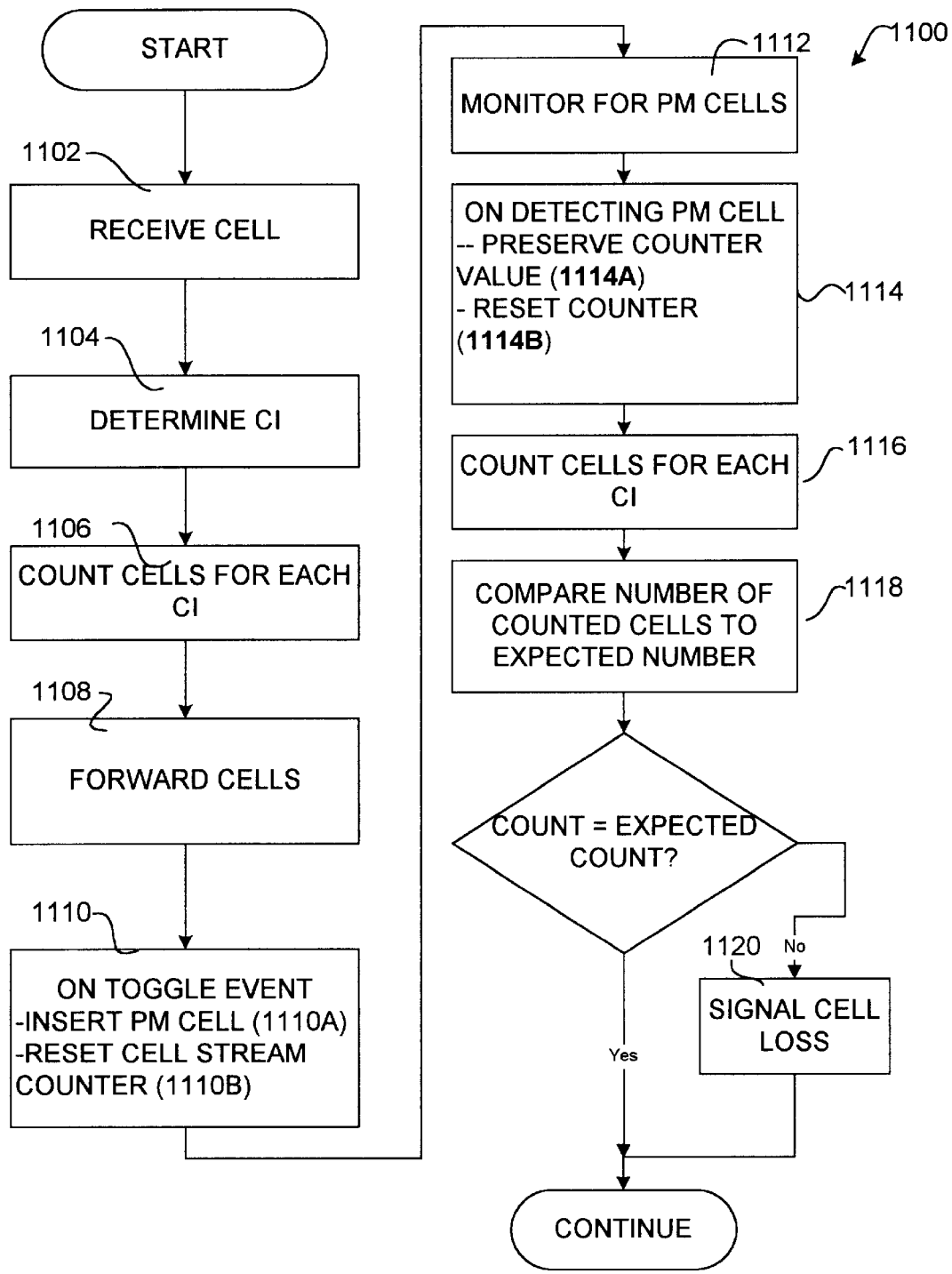
FIG. 11 is a flowchart illustrating a method according to the third exemplary embodiment of the invention.

FIGS. 10 and 11 illustrate a third exemplary embodiment of the invention. In the embodiment of FIGS. 10 and 11, a synchronization signal is included in a Performance Measurement (or "PM") cell. PM cells are additional, identifiable, ATM cells which are inserted from time to time into each cell stream being monitored. In the FIG. 10 embodiment, synchronization flag setter 64 is replaced by a PM cell inserter 84. PM cell inserter 84 receives a signal from counter 62 on line 65 when a PM cell should be inserted into a cell stream. A PM cell detector 85 detects PM cells and sends a signal to counter 69 which causes counter 69 to preserve the number of cells counted in the cell stream in which the PM cell was detected since the last PM cell in that cell stream.

Two modes of operation are possible. In a first mode of operation, PM cells are periodically inserted into the cell stream in such a manner that a predetermined number of other cells in the cell stream are sandwiched between each pair PM cells. For example, a PM cell could be sent in a cell stream each time that counter 62 has counted 128 other cells in the cell stream.

In a second mode of operation, PM cells are inserted into cell streams such that the number of cells in a cell stream between sequential PM cells in the cell stream may vary. In this case, PM cell inserter 84 inserts into each PM cell a number which indicates how many other cells have passed in the data stream since the most recent previous PM cell was sent in that cell stream.

As shown in FIG. 11, a method 1100 which implements the first mode of operation begins by receiving cells at a connection identifier 61 and determining the connection identifier (Steps 1102 and 1104). The cells for each connection identifier are then counted at a counter 62 (Step 1106) and then forwarded (step 1108). If the value counted by counter 62 indicates that a PM cell should be inserted into a cell stream then PM inserter 84 inserts a PM cell into the cell stream (Step 1110).

At a down stream location the cell streams are monitored for PM cells (step 1112). The number of cells in each cell stream are counted (step 1116). When a PM cell is detected in a cell stream then the number of cells counted for that cell stream is preserved (step 1114A) and the downstream counter for that cell stream is reset (step 1114B). The number of cells counted between PM cells is then compared to the expected value (Step 1118). If the count matches the expected value then no cell loss has been detected. If the count does not match the expected value then a cell loss error signal is generated (Step 1120).

EXAMPLE 4

Sequence Numbers Provide Count Synchronization Signal

Figure 12:
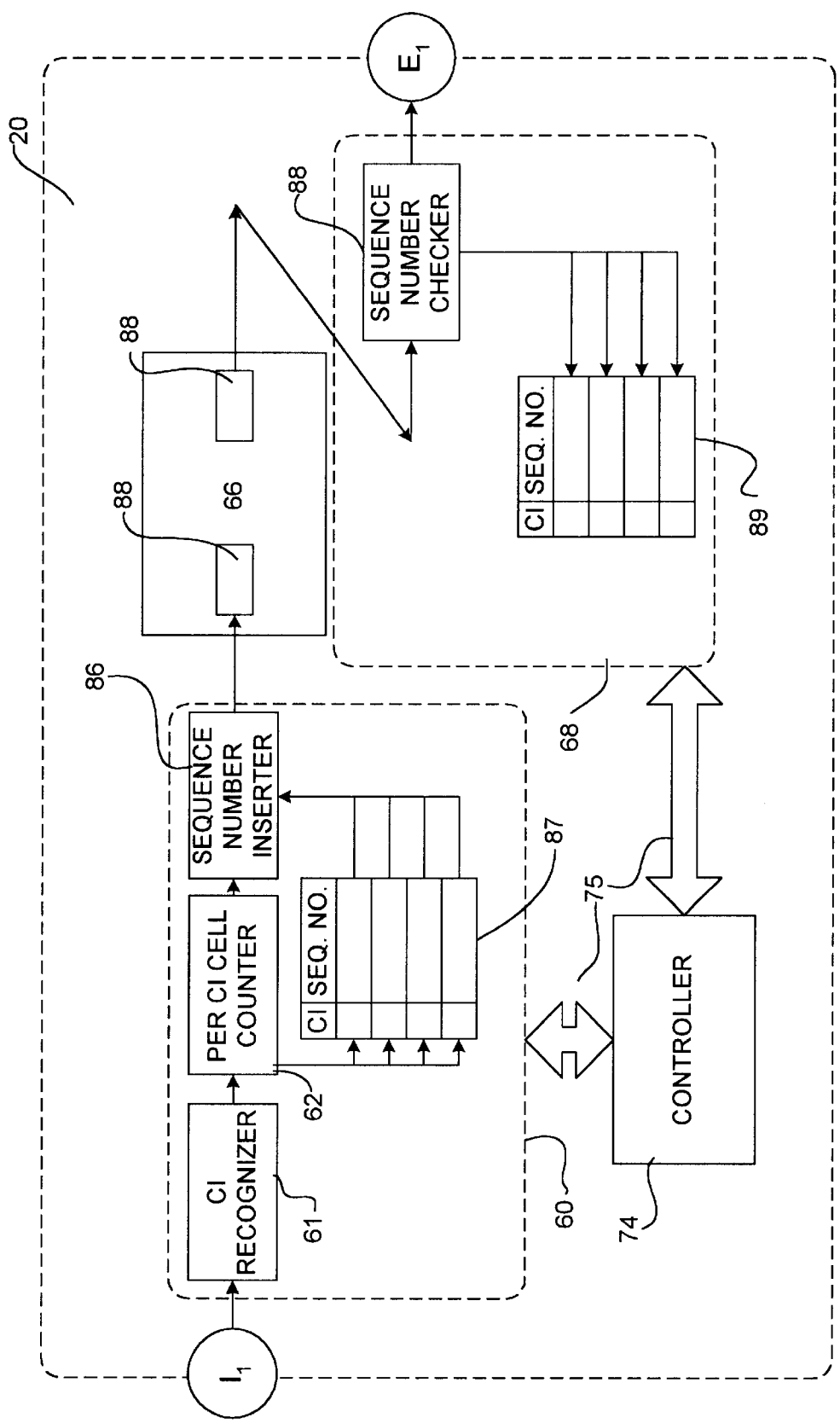
FIG. 12 is a block diagram illustrating apparatus set up according to a fourth exemplary embodiment of the invention.
Figure 13:
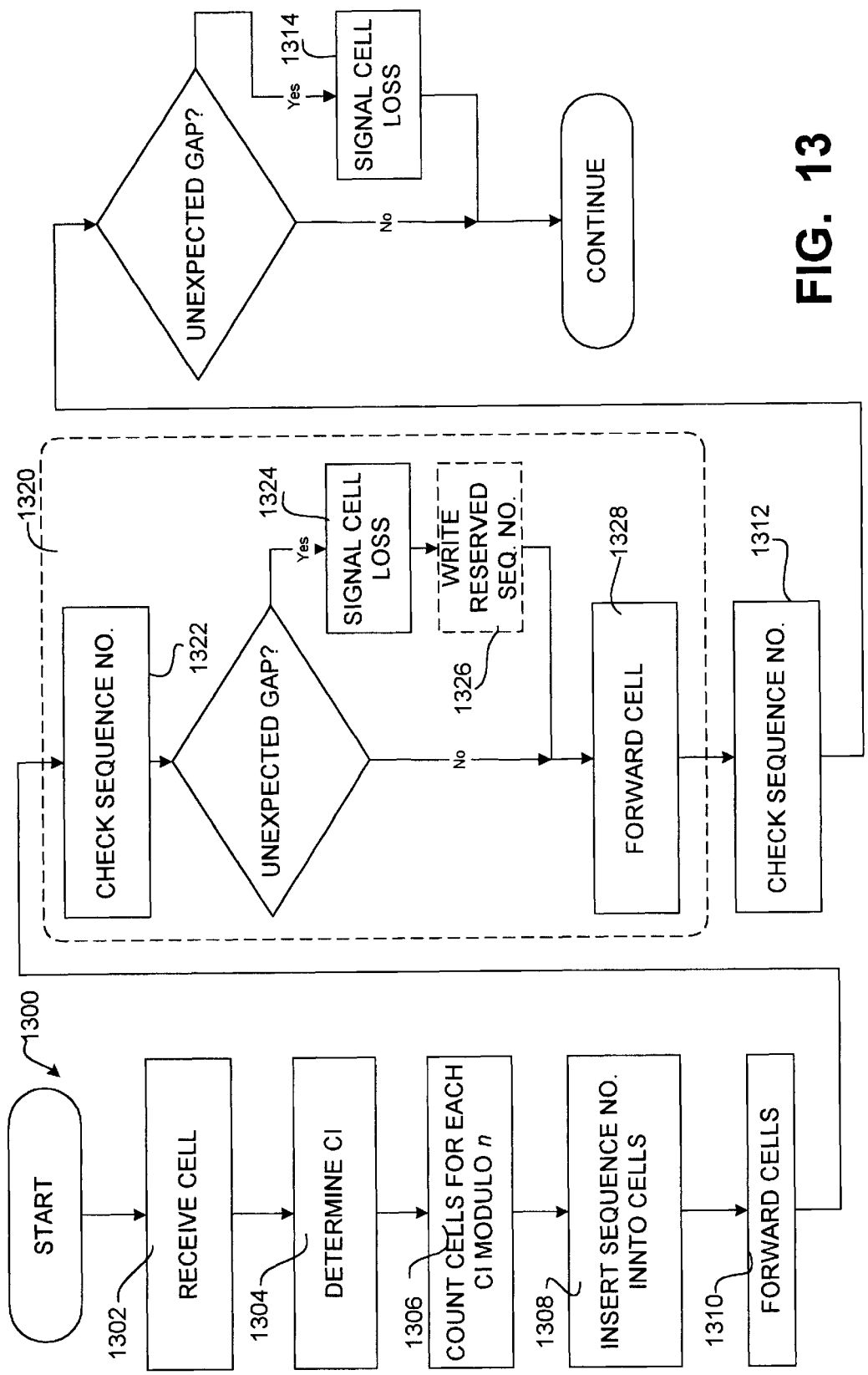
FIG. 13 is a flowchart illustrating a method according to the fourth exemplary embodiment of the invention.

FIGS. 12 and 13 illustrate a fourth exemplary embodiment of the invention. This embodiment differs from the embodiments described above in that a counter value for each cell is delivered in the cell stream to down stream locations.

As shown in FIG. 12, apparatus 20 includes a counter 62 which counts the cells passing the counter in each cell stream and stores a sequence number in an associated array 87. A sequence number inserter 86 inserts the sequence number of each cell into the cell at an up stream location. One or more sequence number checkers 88 are located at downstream locations. Each sequence number checker 88 has a an associated array 89 for holding sequence numbers of previously received cells in each cell stream.

The apparatus 20 of FIG. 12 can be operated according to the method 1300 of FIG. 13. Method 1300 begins by receiving a cell (Step 1302) and determining the cell stream to which the cell belongs (Step 1304). A sequence number is generated for each cell in each cell stream. The sequence number counts cells in the cell stream modulo-n, where n is an integer (step 1306). The sequence number is then added to each cell in each cell stream being monitored (Step 1308). The sequence numbers may be a sequence of consecutive integers, in either ascending or descending order, but are preferably a pseudo-random sequence of numbers which repeats after n counts. As is known in the art, such sequences can be obtained by writing a number in the sequence into a linear feedback shift register and clocking the shift register. What is required is that the series of sequence numbers be predictable.

Preferably the sequence number is stored in a portion of the ATM cell header which is not being used while the cell is in transit through the telecommunications device. For example, the VPI/VCI fields of a standard ATM cell is header are not typically used or needed while the cell is passing through a telecommunication device. The sequence number is preferably stored in a portion of the VPI and/or VCI fields in the cell header. The sequence number could, in the alternative be stored in an additional data set, such as a header or trailer, added to each ATM cell.

At a downstream location, the sequence number for the cell is read and checked against the expected value for the sequence number (Step 1312). If the sequence numbers are a series of pseudo random numbers then the expected sequence number is the next pseudo-random number in the series. A linear feedback shift register may be provided at the downstream location to generate the expected sequence number from the sequence number for the previous cell in the cell stream. If the sequence numbers are ascending integers then the expected sequence number is greater than the sequence number of the previous cell in the cell stream by one.

If there is an unexpected gap in sequence numbering for a cell stream then a cell sequence error is generated (Step 1314). The cell is then forwarded to the egress of the telecommunications device. Cell sequence errors might be caused by reordering of cells in a cell stream or insertion of cells into the cell stream as well as the unexpected dropping of cells from the cell stream.

As shown in FIG. 12, Additional sequence checkers 88 could be provided at various downstream points within the telecommunications device. In such cases method 1200 would includes an intermediate step 1320 of checking the sequence number at an intermediate location. Step 1320 includes checking the sequence number of the cell (Step 1322) and, if there is an unexpected gap in sequence numbers for a cell stream, signalling an error (Step 1324). Optionally a reserved sequence number may be written to a cell if an unexpected gap in the sequence number is detected (Step 1326). The reserved sequence number indicates to other sequence number checkers farther downstream that the sequence error has already been detected. This prevents multiple cell loss signals being generated as a result of the loss of a single cell. Cells are then forwarded downstream (Step 1328). If no unexpected gap is detected in a sequence number then the cell is simply forwarded down stream (Step 1328).

When the sequence number sequence chosen repeats modulo-n it is not possible to detect a burst of cell loss which is a multiple of n cells long or to distinguish between a loss of a burst of more than n cells and a loss of fewer than n cells. Thus, if 3-bit recirculating counters are used for sequence numbering (i.e. the counting is modulo-8) losses of 8 cells from a cell stream cannot be detected. Because of the way that memory is arranged in most telecommunications devices it is most likely that burst of cell loss will lose cells in some multiples of a power of 2. An inventive solution to this problem is to make the sequence repeat every m counts, where m is not a power of 2. Preferably, m is an odd number. Most preferably m is given by $m=2^P-1$, where P is an integer. If this is done then losses of bursts of $2^b$ cells will be detected, where b is any integer.

For example, a series of 3-bit sequence numbers which repeats after 7 counts may be used to provide sequence numbers for cells in each cell stream. The unused state of a 3-bit sequence number could be used to signal an error condition as described above in respect of Step 1326. For example, the sequence number 000 may be reserved to indicate that a sequence error has been previously been detected and the sequence numbers can cycle from 001 through to 111, either sequentially or in some pseudo-random sequence of length 7.

EXAMPLE 5

Connection Identifier Carries Count Synchronization Signal

Figure 14:
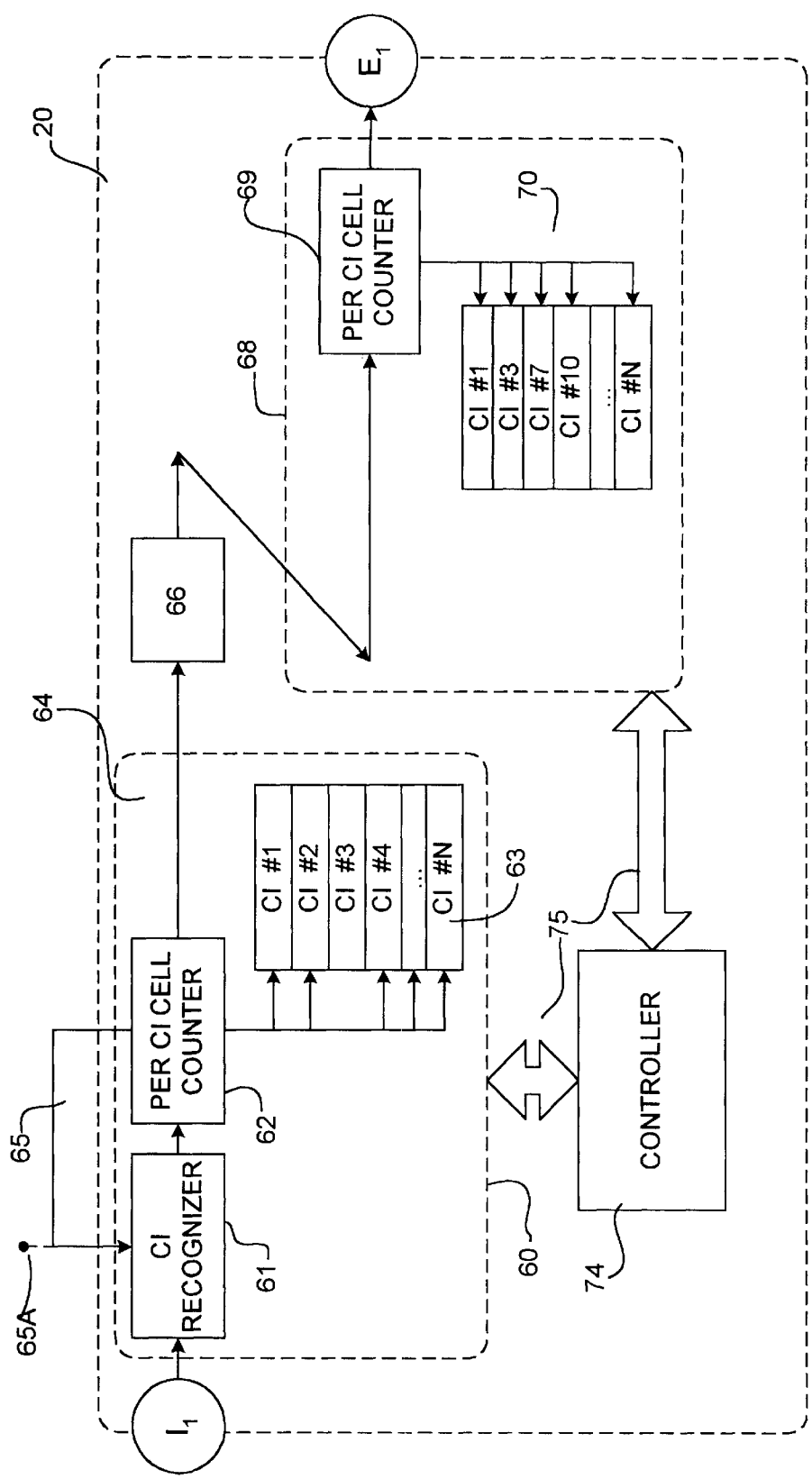
FIG. 14 is a block diagram illustrating apparatus set up according to a fifth exemplary embodiment of the invention; and, FIG. 15 is a flowchart illustrating a method according to the fifth exemplary embodiment of the invention.
Figure 15:
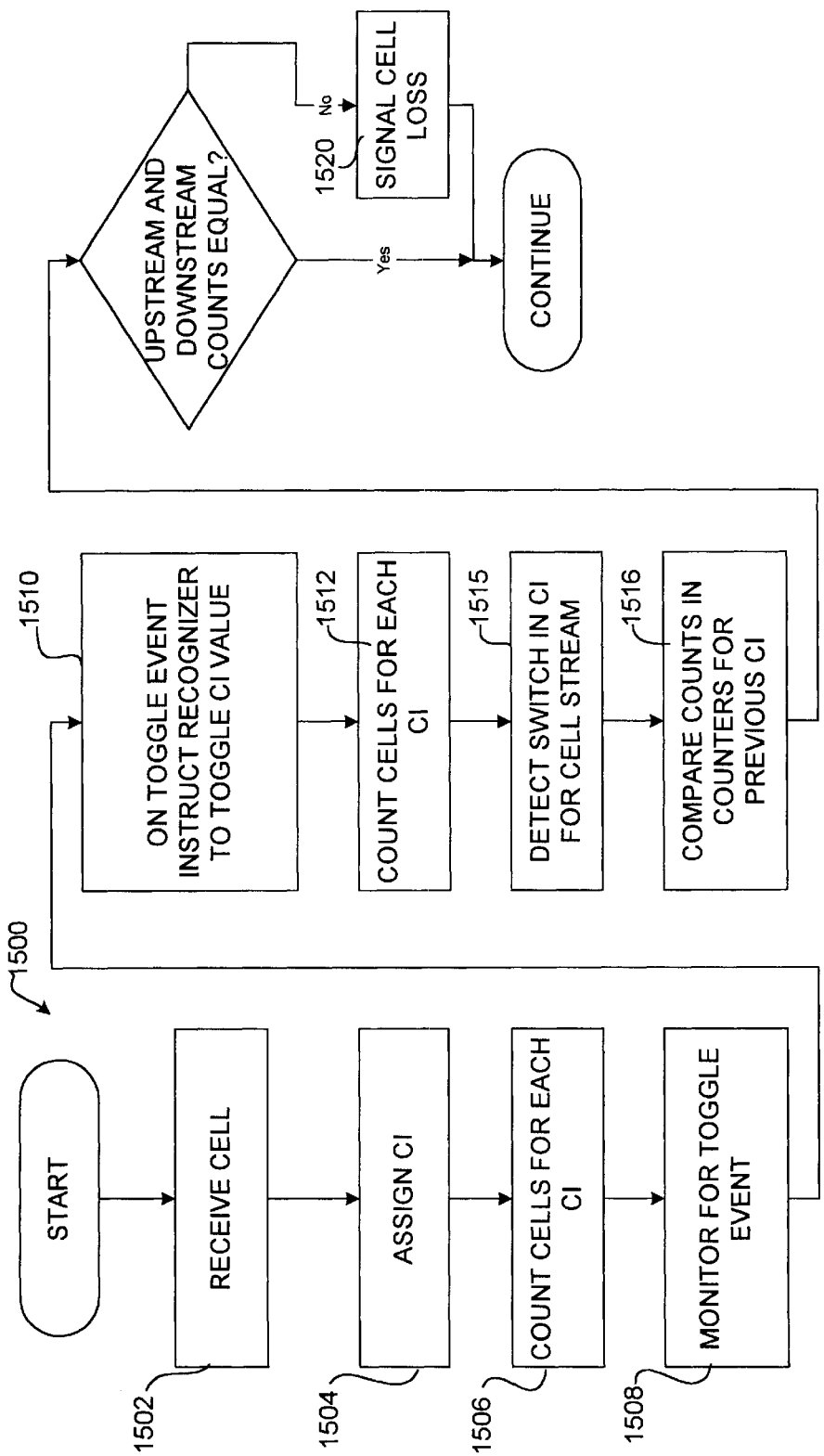

FIGS. 14 and 15 illustrate a fifth embodiment of the invention. In the apparatus of FIG. 14 a CI recognizer 61 identifies the cell stream to which each cell arriving at ingress $I_1$ belongs. CI recognizer 61 assigns to each cell stream a connection identifier ("CI"). The connection identifier is written to an additional header attached to the cell. A counter 62 counts the number of cells passing through it for each distinct CI value. Connection recognizer 61 is capable of assigning any one of two or more alternative connection identifiers to each cell stream. Which one of the two or more connection identifiers is assigned to each cell stream is determined by a signal received from counter 62 on a signal line 65.

In a preferred embodiment of the invention the value of CI used to identify cells in a cell stream toggles between a first value and a second value each time a predetermined number of cells is delivered in the cell stream. At a down stream location, a counter 69 simply counts the number of cells received for each value of the connection identifier. As soon as the CI recognizer 61 begins switches to assigning the second value of CI to cells in a cell stream then the value in the counter for the first CI value will be preserved. After the last cell to which the first value of CI has been assigned has passed to and counted at downstream counter 69 then the downstream counter for the first value of CI for the cell stream is preserved. The downstream counter 69 knows that the last cell to which the first value of CI has been assigned has been counted as soon as it counts a cell having the second CI value. The number of cells counted respectively by counters 62 and 69 having the first value of CI can then be compared to determine if any cells have been lost.

FIG. 15 illustrates a method 1500 according to the invention. Cells are received in Step 1502. A CI value is assigned to each cell in step 1504. The CI value for each cell is determined by the cell stream to which the cell belongs. There are two possible values for CI for each cell stream. After the connection identifier is assigned the cells are counted (step 1506). A separate count is kept for cells having each different value of CI. Method 1500 monitors for the occurrence of a toggle event (step 1508). In a preferred embodiment, the toggle event occurs when counter 90 reaches a predetermined value. For example, a toggle event may be the toggling of the highest order bit of a 32-bit counter. The toggle event could also be an externally generated signal delivered on signal line 65A. The externally generated signal may be generated on the basis of time or on some other basis. For example, an externally generated signal may be supplied every one minute by an external timer.

On the occurrence of a toggle event for a cell stream, CI recognizer 61 switches to assign the alternate connection identifier to cells in that cell stream (step 1410). The cells propagate to the downstream location. At the down stream location cells are counted for each connection identifier (Step 1412). A short time after CI recognizer 61 switches the connection identifier assigned to cells in a cell stream from a first value to a second value, cells having the second value of CI will be received at the downstream location (step 1414). At this point it is known that all of the cells having the first value of CI have been counted at the downstream location because cells pass sequentially to the downstream location. After step 1414 the upstream and downstream counts for the first value of CI may be compared (step 1416). If the upstream and downstream counts are not equal then a cell loss error signal can be generated (Step 1420).

The method of this Example 5 is equivalent to the method of Example 1 when the two alternative connection identifiers for a cell stream differ by one bit. That one bit operates as a cell synchronization lag carried in the CI field for the cell.

The method of example 5 may be extended to detect a loss of one or more cells in a cell stream flowing between an upstream location and a downstream location in an ATM network, not necessarily within a telecommunication device. This may be done by assigning a first one of two or more alternative VPI/VCI value to cells in the cell stream at a point which is at the upstream location or upstream from the upstream location. Next the number of ATM cells having the first VPI/VCI value which pass the upstream location are counted. The number of cells having the first VPI/VCI value which pass the downstream location are also counted. In response to a toggle event, a second VPI/VCI value is assigned to cells in the cell stream in place of the first VPI/VCI value. After detecting a cell at the downstream location which has the second VPI/VCI value, the method compares the number of cells having the first VPI/VCI value counted at the upstream location to the number of cells having the first VPI/VCI value counted at the downstream location. If the numbers are not equal then cells have either been lost from or inserted into the cell stream between the upstream and downstream locations and an alarm signal may be generated.

There are many possible variations of the invention. All involve passing information from an upstream location to a downstream location in a cell stream. One particularly useful variation of the invention combines the methods of Examples 1 and 4. A synchronization signal which includes both a modulo-n sequence number and a more slowly varying synchronization flag is inserted into each cell in a cell stream. The synchronization signal may, for example, be generated by counting the number of cells in each cell stream with an m bit counter, m being, for example, 32-bits. The synchronization signal could be the value of the highest order bit of the m-bit counter together with the values of one or more of the lowest order bits of the m-bit counter. This signal could be written to each cell. The lowest order bits of the m-bit counter could be used as a sequence number, as described above, to immediately detect sequence errors which indicate the loss of one or more cells. Upon toggling of the higher order bit, the number of cells passing since the most previous time the highest order bit toggled could be compared to an expected number. This would provide a more accurate estimation of the actual number of lost cells as well as detect cell losses involving a multiple of n bits. By way of example only, the sequence number could include the 2 or 3 lowest order bits of the m-bit counter.

Various other embodiments and variations of the invention will be apparent to those skilled in the art. For example, the above descriptions of various methods include some steps which do not depend upon the result of the immediately preceding step. The order of these steps can be varied without affecting the operation of the invention, as will be clear to anyone skilled in the art. Furthermore, various kinds of apparatus may be used to practice the invention. In a typical modern ATM switch logic is implemented in application specific integrated circuits (ASICs) or field programmable gate arrays (FPGAs). Various hardware configurations may be used to provide the counters and other functional elements which are required for the practice of the methods of the invention in ways which are well known to those skilled in the art.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method for detecting cell loss in an ATM telecommunication device, the method comprising:

counting ATM cells of a cell stream entering a telecommunication device at an upstream point within the telecommunication device;

counting ATM cells in the cell stream at a downstream point downstream from the upstream point within the telecommunication device;

in response to a toggle event, preserving a count of the ATM cells counted at the upstream point and passing a count synchronization signal in one of the cells of the cell stream;

at the downstream point, receiving the cell carrying the count synchronization signal, detecting the count synchronization signal and, in response to the count synchronization signal, preserving a down stream count of the ATM cells counted at the downstream point; and, comparing the upstream and downstream counts.

2. The method of claim 1 wherein the count synchronization signal is a flag embedded in the ATM cell.

3. The method of claim 2 wherein the flag is located in the VPI/VCI field of the cell.

4. The method of claim 3 wherein the flag consists of a single bit.

5. The method of claim 1 comprising adding an additional data set to each ATM cell in the cell stream wherein the count synchronization signal comprises a flag in the additional data set.

6. The method of claim 1 wherein the count synchronization signal comprises a change in a connection identifier of cells in the cell stream from a first value to a second value.

7. The method of claim 6 comprising maintaining two counters at the downstream point, a first counter counting cells in the cell stream having a connection identifier equal to the first value and a second counter counting cells in the cell stream having a connection identifier equal to the second value.

8. The method of claim 6 comprising assigning two or more connection identifiers to the cell stream, wherein passing the count synchronization signal comprises switching from assigning a first one of the two or more connection identifiers to the cell stream to assigning a second one of the two or more connection identifiers to the cell stream.

9. The method of claim 8 comprising maintaining a plurality of counters, one of the counters corresponding to each of the two or more connection identifiers, each of the counters recording a number of cells received at the downstream point having a corresponding one of the two or more connection identifiers.

10. The method of claim 1 comprising generating sequence numbers, inserting the sequence numbers into cells at the up stream point, reading the sequence numbers at the down stream point and comparing each of the sequence numbers to an expected sequence number.

11. A method for detecting cell loss in an ATM telecommunication device, the method comprising:

at an upstream point counting ATM cells in a cell stream entering a telecommunication device and generating and inserting sequence numbers into cells in the cell stream;

counting cells in the cell stream at a point downstream within the telecommunication device;

in response to a toggle event, preserving a count at the upstream point and passing a count synchronization signal in a cell in the cell stream;

at the downstream point, reading the sequence numbers and comparing the sequence numbers to expected sequence numbers, receiving the cell carrying the count synchronization signal, detecting the count synchronization signal, and, in response to the count synchronization signal, preserving a down stream count;

comparing the upstream and downstream counts;

wherein the sequence number is a number in a repeating sequence of n sequence numbers where n is an integer which is not a power of 2.

12. The method of claim 11 wherein n is odd.

13. The method of claim 12 wherein $n=2^P-1$, where P is an integer.

14. The method of claim 13 wherein P=3.

15. The method of claim 11 wherein the repeating sequence of n sequence numbers is a pseudo-random sequence.

16. A method for detecting cell loss in an ATM telecommunication device, the method comprising:

at an upstream point counting ATM cells in a cell stream entering a telecommunication device and generating and inserting sequence numbers into cells in the cell stream;

counting cells in the cell stream at a point downstream within the telecommunication device;

in response to a toggle event, preserving a count at the upstream point and passing a count synchronization signal in a cell in the cell stream;

at the downstream point, reading the sequence numbers, comparing the sequence numbers to expected sequence numbers, receiving the cell carrying the count synchronization signal, detecting the count synchronization signal, and, in response to the count synchronization signal, preserving a down stream count; comparing the upstream and downstream counts; wherein the count synchronization signal comprises a highest order bit of a counter at the up stream location and the sequence number comprises one or more lowest order bits of the counter.

17. The method of claim 16 wherein the sequence number comprises two or three lowest order bits of the counter.

18. A method for detecting cell loss in an ATM telecommunication device, the method comprising:

at an upstream point, counting ATM cells in a cell stream entering a telecommunication device;

counting ATM cells in the cell stream at a point downstream within the telecommunication device;

in response to a toggle event, preserving a count at the upstream point and passing a count synchronization signal in a cell in the cell stream;

at the downstream point, receiving the cell, detecting the count synchronization signal and, in response to the count synchronization signal, preserving a down stream count; and, comparing the upstream and downstream counts wherein the method comprises providing an active counter and an inactive counter at the upstream point and providing an active counter and an inactive counter at the downstream point for each of one or more cell streams, wherein preserving a count at the upstream point comprises making the upstream active counter inactive while making the upstream inactive counter active and wherein preserving a count at the downstream point comprises making the downstream active counter inactive while making the downstream inactive counter active.

19. A method for detecting cell loss in an ATM telecommunication device, the method comprising:

at an upstream point, counting ATM cells in a cell stream entering a telecommunication device;

counting ATM cells in the cell stream at a point downstream within the telecommunication device;

in response to a toggle event, preserving a count at the upstream point and passing a count synchronization signal in a cell in the cell stream;

at the downstream point, receiving the cell, detecting the count synchronization signal and, in response to the count synchronization signal, preserving a down stream count; and, comparing the upstream and downstream counts wherein the method comprises providing a first plurality of counters counting cells in a cell stream at the upstream point and providing a second plurality of counters counting cells in the cell stream at the downstream point, wherein preserving a count at the upstream point comprises making an active one of the first plurality of counters inactive and wherein preserving a count at the downstream point comprises making an active one of the second plurality of counters inactive.

20. A method for detecting cell loss in an ATM telecommunication device, the method comprising:

at an upstream point, counting ATM cells in a cell stream entering a telecommunication device;

counting ATM cells in the cell stream at a point downstream within the telecommunication device;

in response to a toggle event, preserving a count at the upstream point and passing a count synchronization signal in a cell in the cell stream;

at the downstream point, receiving the cell, detecting the count synchronization signal and, in response to the count synchronization signal, preserving a down stream count; and, comparing the upstream and downstream counts wherein the method comprises inserting a PM cell into the cell stream wherein the count synchronization signal is passed in the inserted PM cell and the inserted PM cell comprises information specifying a number of cells counted in the cell stream at the upstream point since a previous PM cell.

21. The method of claim 1 wherein the toggle event comprises a number of cells counted in the cell stream at the upstream location being equal to a predetermined number.

22. The method of claim 21 wherein counting ATM cells in the cell stream at a point downstream within the telecommunication device comprises counting down from the predetermined number.

23. An ATM telecommunication device comprising:
  a) a data path connecting an input port and an egress port;
  b) a counter at an upstream point in the data path, the counter operable to count ATM cells in a cell stream entering the telecommunication device by way of the input port and to preserve a number of cells counted in the cell stream upon the occurrence of a toggle event;
  c) a counter at a downstream point in the data path, the counter operable to count ATM cells in the cell stream at the downstream point;
  d) a count synchronization signal inserter at the upstream point, the count synchronization signal inserter operable to insert a count synchronization signal into one of the cells of the cell stream in response to a toggle event;
  e) a count synchronization signal detector at the downstream point, the count synchronization signal detector connected to preserve a count at the downstream counter upon detecting a count synchronization signal; and,
  f) a comparer for comparing counts preserved at the upstream and downstream points after the occurrence of a toggle event.

24. A method for detecting a loss of one or more cells in a cell stream flowing between an upstream location and a downstream location in an ATM network, the method comprising:
  (a) assigning a first VPI/VCI value to cells in the cell stream at or upstream from the upstream location;
  (b) counting ATM cells having the first VPI/VCI value passing the upstream location;
  (c) counting ATM cells having the first VPI/VCI value passing the downstream location;
  (d) in response to a toggle event, switching to assign a second VPI/VCI value different from the first VPI/VCI value to cells in the cell stream; and,
  (e) in response to receiving a cell at the downstream location having the second VPI/VCI value, comparing the number of cells having the first VPI/VCI value counted at the upstream location to the number of cells having the first VPI/VCI value counted at the downstream location.

25. A method for detecting cell loss in an ATM telecommunication device, the method comprising:
  at an upstream point counting ATM cells in a cell stream entering a telecommunication device and generating and inserting synchronization signals comprising sequence numbers into the cells of the cell stream wherein each of the sequence numbers is a number in a repeating sequence of n sequence numbers where n is an integer which is not a power of 2;
  at a downstream point within the telecommunication device, reading the sequence numbers and comparing the sequence numbers to expected sequence numbers.

26. The method of claim 25 wherein n is odd.

27. The method of claim 26 wherein $n=2^P-1$, where P is an integer.

28. The method of claim 25 wherein the repeating sequence of n sequence numbers is a pseudo-random sequence.

* * * * *